United States Patent
Chasey

(10) Patent No.: US 8,829,349 B2
(45) Date of Patent: Sep. 9, 2014

(54) OXIDES FOR PROTECTION AGAINST ELECTROCHEMICAL OXIDATION AND IONIC CONTAMINATION IN MEDIUM-VOLTAGE POWER-CABLE INSULATION

(75) Inventor: Kent L. Chasey, Wichita, KS (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 726 days.

(21) Appl. No.: 12/610,717

(22) Filed: Nov. 2, 2009

(65) Prior Publication Data

US 2010/0276175 A1 Nov. 4, 2010

Related U.S. Application Data

(60) Provisional application No. 61/138,820, filed on Dec. 18, 2008.

(51) Int. Cl.
*H01B 3/28* (2006.01)
*C08K 3/30* (2006.01)
*C08L 23/16* (2006.01)
*C08K 5/14* (2006.01)
*C08K 3/22* (2006.01)

(52) U.S. Cl.
CPC . *C08K 3/30* (2013.01); *C08L 23/16* (2013.01); *C08K 5/14* (2013.01); *C08K 3/22* (2013.01)

USPC .................................................. 174/110 SR

(58) Field of Classification Search
USPC ...................................... 174/110 R, 110 SR
See application file for complete search history.

(56) References Cited

U.S. PATENT DOCUMENTS

| | | |
|---|---|---|
| 2,972,600 A | 2/1961 | Braidwood |
| 3,287,440 A | 11/1966 | Giller |
| 4,311,628 A | 1/1982 | Abdou-Sabet et al. |
| 5,656,693 A | 8/1997 | Ellul et al. |
| 6,433,090 B1 | 8/2002 | Ellul et al. |
| 2004/0079547 A1 | 4/2004 | Rodway et al. |
| 2005/0205290 A1* | 9/2005 | Pinacci et al. ............. 174/121 A |
| 2007/0134506 A1* | 6/2007 | Chasey et al. ................. 428/492 |
| 2009/0081151 A1* | 3/2009 | Toyoda et al. ............. 424/78.02 |
| 2009/0247719 A1* | 10/2009 | Ennis ............................ 526/348 |

FOREIGN PATENT DOCUMENTS

EP 0 862 187 9/1998

OTHER PUBLICATIONS

Chemical and Engineering News, 1985, vol. 63, No. 5, p. 27.

* cited by examiner

*Primary Examiner* — Chau N Nguyen

(57) ABSTRACT

Insulation compounds for medium-voltage power cables and methods for making same are provided. The compound can include a polymer comprising ethylene, one or more $C_3$-$C_8$ alpha olefins and, optionally, one or more dienes, and one or more metal oxides not based on lead or zinc.

9 Claims, 2 Drawing Sheets

ATR-FTIR Absorbances for Aliphatic CH and Carbonyl
(Screening Samples and Control Sample, after Heat Aging 72 hrs at 125C)

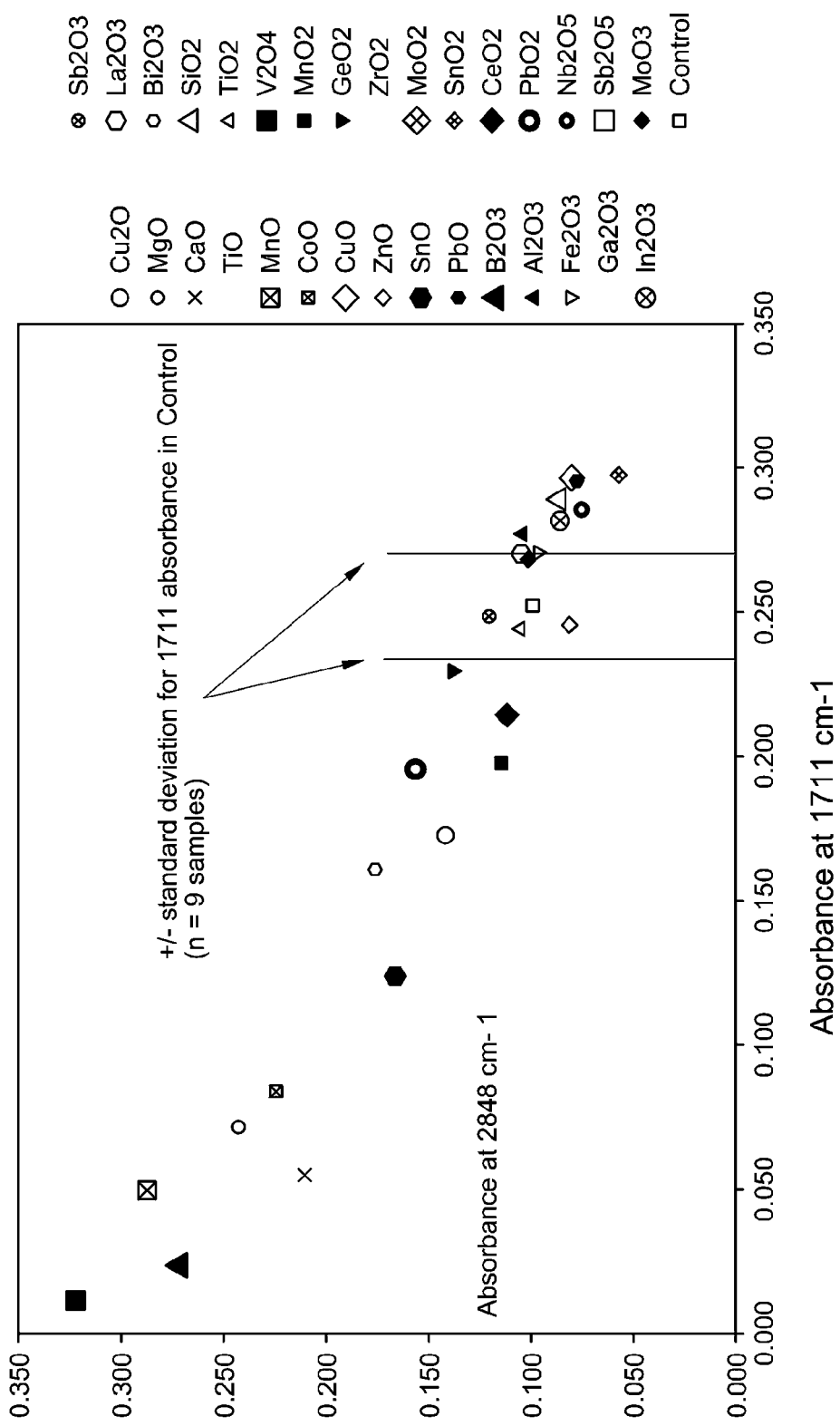

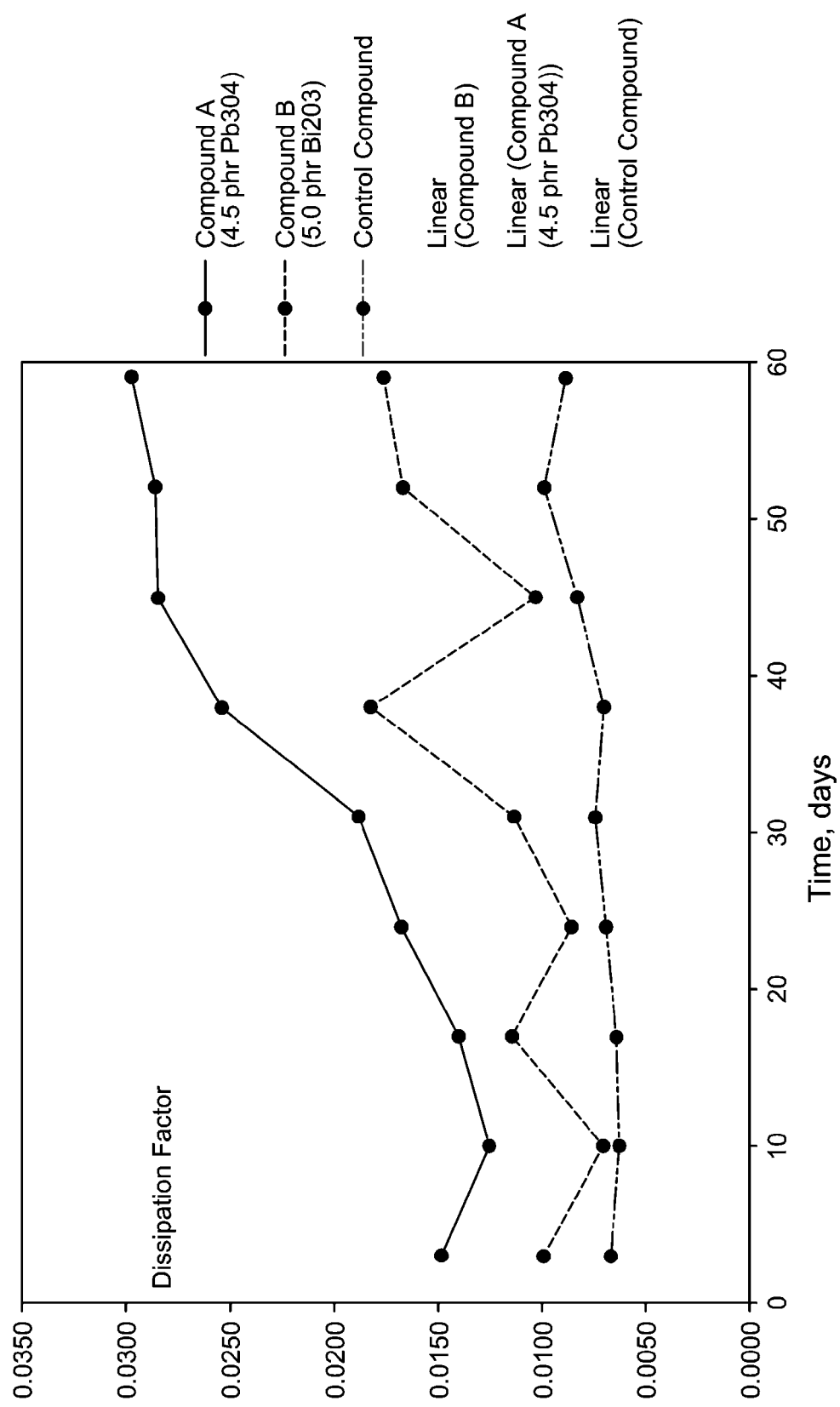

OXIDES FOR PROTECTION AGAINST ELECTROCHEMICAL OXIDATION AND IONIC CONTAMINATION IN MEDIUM-VOLTAGE POWER-CABLE INSULATION

PRIORITY CLAIM

This application claims priority to and the benefit of U.S. Ser. No. 61/138,820, filed Dec. 18, 2008.

FIELD OF THE INVENTION

Embodiments of the present invention generally relate to polymers for insulation compounds in medium voltage power cables.

BACKGROUND OF THE INVENTION

Thermoset medium-voltage insulation compounds that have been used in 5,000 to 39,000 volt transmission and distribution cable, and higher voltage cables as well, have been based on cross-linked (also referred to as cured) polyethylene (PE) homopolymers, copolymers of ethylene and alpha olefins such as propylene, butene, or octene (EP, EB, EO), and terpolymers of ethylene, propylene, and a diene (EPDM). Any of those thermoset compounds are subject to in-service polymer oxidation or ionic contamination, which can result in a breakdown of their electrical performance.

Such polymer oxidation is referred to as electrochemical oxidation, and typically involves a two-step process. First, ground water often migrates through the cable jacket and the semiconductive insulation layer of the cable to contact the polymer. Second, electrical stresses at the polymer/water interface initiate a series of free-radical reactions, which lead to the decomposition of the water and the oxidation of polymer. Ionic contamination can result from (a) invasion of ionic species via ground-water ingress, as well as (b) concentration of residual ionic species in the thermoset compound.

Additives capable of reducing electrochemical oxidation by precipitation or complexation of undesirable ions may have beneficial impact on in-service cable performance. Medium-voltage insulation compounds, which are based on either ethylene-propylene copolymer or EPDM often contain, as a preferred ingredient, lead tetraoxide, $Pb_3O_4$. Lead tetraoxide has been shown to improve wet-electrical performance in these types of cables by preventing electrochemical oxidation. However, environmental concerns about the disposal of lead-containing chemicals or materials have resulted in efforts to develop replacements for lead tetraoxide in medium voltage insulation.

There is a need, therefore, for environmentally acceptable methods and systems to reduce or eliminate electrochemical oxidation in power cables.

SUMMARY OF THE INVENTION

Insulation compounds for medium-voltage power cables and methods for making same are provided. The compound can include a polymer comprising ethylene and one or more $C_3$-$C_8$ alpha olefins, and one or more metal oxides not based on lead or zinc.

In at least one specific embodiment, the compound can include at least one elastomer comprising ethylene and one or more $C_3$-$C_8$ alpha olefins; zinc oxide; and of from 1 to 10 phr bismuth oxide ($Bi_2O_3$).

A medium-voltage power cable is also provided. In at least one specific embodiment, the cable can include at least one insulative layer comprising at least one rubber compound comprising ethylene, propylene and ethylidene norbornene, wherein the ethylene content is of from 50 wt % to 80 wt %, based on total weight of the rubber, and the ethylidene norbornene content is of from 1 wt % to 7 wt %, based on total weight of the rubber. The rubber compound can further include zinc oxide; and of from 1 phr to 10 phr of one or more metal oxides, wherein the metal is not lead.

BRIEF DESCRIPTION OF THE DRAWINGS

So that the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 graphically depicts ATR FTIR absorbencies for aliphatic CH versus carbonyl, according to one or more embodiments of the compounds herein described.

FIG. 2 graphically depicts results for dissipation factor as a function of time, according to one or more embodiments of the compounds herein described.

DETAILED DESCRIPTION OF THE INVENTION

As used herein, the term "power cable coating composition" or simply "compound" refers to a polymer component or components in combination with fillers, accelerants, curatives, extenders and other components commonly used in the art to form a material having the requisite processing, heat aging, electrical and other properties suitable for use as an insulative coating layer in an electrical cable.

As used herein, the term "polymer" includes homopolymers, copolymers, interpolymers, terpolymers, etc. The term "polymer" also refers to one or more polymers regardless of the method, time, and apparatuses used to combine the polymers. Additionally, the term "polymer" can be used to refer to polymeric compositions.

The term "filler" refers to one or more inorganic particulate fillers such as carbon black, lead, clay, calcined clay, silane treated calcined clay, talc, calcium carbonate, mica, silica, zinc oxides, titanium oxides, magnesium oxides, combinations thereof, and the like.

Ethylene Alpha-Olefin Diene Rubber

The power cable coating composition can be or include one or more ethylene-alpha-olefin-diene polymers, elastomers, or simply "rubber." Such polymers can include ethylene; an alpha olefin, such as propylene; and at least one non-conjugated diene. Non-conjugated dienes useful as co-monomers preferably are straight or branched chain hydrocarbon diolefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Preferred non-conjugated dienes are 5-ethylidene-2-norbornene (ENB), 1,4-hexadiene, dicyclopentadiene (DCPD), norbornadiene, and 5-vinyl-2-norbornene (VNB), with ENB being most preferred.

The elastomer can contain ethylene-derived units ("ethylene content") in an amount ranging from a lower limit of 50, or 60, or 65, or 68 weight percent to an upper limit of 80 or 85 or 90 weight percent, based on the total weight of the polymer. The diene content of the elastomer can range of from a lower limit of 0.1, or 0.16 weight percent to an upper limit of 0.4, or 1.5, or 5 weight percent, based on the total weight of the polymer.

The elastomer can also be characterized by a Mooney viscosity (ML [1+4] 125° C.) of from 10 to 80, and a molecular weight distribution (Mw/Mn) of greater than 6, or greater than 10.

The elastomer can have a molecular weight distribution Mw/Mn of greater than 3, or greater than 6, or greater than 10. Molecular weight distribution (MWD) is a measure of the range of molecular weights within a given polymer sample. Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

The elastomer can also have a branching index (g') within the range having a lower limit of 0.05, or 0.1 and an upper limit of 0.3, or 0.4, or 0.5, or 0.7, or 0.8, or 0.9, or 1.0, or 1.5. The branching index g' is defined as:

$$g' = \frac{[\eta]_{avg}}{kM_v^\alpha}$$

where, "k" and "α" are the Mark Houwink coefficients for a linear polymer of the same chemical species. For example, α=0.695 for ethylene, propylene, and butene polymers; and k=0.000579 for ethylene polymers, k=0.000262 for propylene polymers, and k=0.000181 for butene polymers. $M_v$ is the viscosity-average molecular weight based on molecular weights determined by LS analysis. The average intrinsic viscosity, $[\eta]_{avg}$, of the sample is defined as:

$$[\eta]_{avg} = \frac{\sum c_i [\eta]_i}{\sum c_i}$$

where the summations are over the chromatographic slices, i, between the integration limits.

In one or more embodiments, the power cable coating composition contains the one or more ethylene-alpha-olefin-diene elastomers in an amount of from 40 wt % to 99 wt %, based on total weight of the composition. In one or more embodiments, the one or more ethylene-alpha-olefin-diene elastomers are present in an amount ranging from a low of about 45 wt %, 55 wt %, or 65 wt % to a high of about 75 wt %, 85 wt %, or 95 wt %, based on total weight of the composition.

Ethylene Alpha-Olefin Polymer

In one or more embodiments, the power cable coating composition can be or include one or more ethylene alpha-olefin polymers. Suitable ethylene alpha-olefins are metallocene-catalyzed polymers of ethylene and an alpha-olefin comonomer, the alpha-olefin being a $C_3$-$C_{20}$ alpha-olefin and preferably a $C_3$-$C_{12}$ alpha-olefin. The alpha-olefin comonomer can be linear or branched, and two or more comonomers can be used, if desired. Examples of suitable alpha-olefin comonomers include propylene, linear $C_4$-$C_{12}$ alpha-olefins, and alpha-olefins having one or more $C_1$-$C_3$ alkyl branches. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include ethylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituent on any of $C_3$-$C_5$, 1-pentene with two methyl substituents in any stoichiometrically acceptable combination on $C_3$ or $C_4$, 3-ethyl-1-pentene, 1-octene, 1-pentene with a methyl substituent on any of $C_3$ or $C_4$, 1-hexene with two methyl substituents in any stoichiometrically acceptable combination on $C_3$-$C_5$, 1-pentene with three methyl substituents in any stoichiometrically acceptable combination on $C_3$ or $C_4$, 1-hexene with an ethyl substituent on $C_3$ or $C_4$, 1-pentene with an ethyl substituent on $C_3$ and a methyl substituent in a stoichiometrically acceptable position on $C_3$ or $C_4$, 1-decene, 1-nonene, 1-nonene with a methyl substituent on any of $C_3$-$C_9$, 1-octene with two methyl substituents in any stoichiometrically acceptable combination on $C_3$-$C_7$, 1-heptene with three methyl substituents in any stoichiometrically acceptable combination on $C_3$-$C_6$, 1-octene with an ethyl substituent on any of $C_3$-$C_7$, 1-hexene with two ethyl substituents in any stoichiometrically acceptable combination on $C_3$ or $C_4$, and 1-dodecene. It should be appreciated that the list of comonomers above is merely exemplary, and is not intended to be limiting. A particularly preferred comonomer is octene.

The ethylene alpha-olefin polymer can have one or more of the following characteristics:

(i) a molecular weight distribution Mw/Mn ranging from a lower limit of 1.5 or 1.8 to an upper limit of 40, or 20, or 10, or 5, or 3;

(ii) a Composition Distribution Breadth Index (CDBI) greater than 50% or greater than 60% or greater than 65%;

(iii) a Melt Index Ratio $I_{10}/I_2$ ranging from a lower limit of 5, or 7, or 8 to an upper limit of 9 or 10; and (iv) a Melt Index Ratio $I_{21}/I_2$ ranging from a lower limit of 20, or 25, or 30 to an upper limit of 40, or 45, or 50.

Examples of suitable ethylene alpha-olefins include several of the polymers sold under the trademark EXACT and available from ExxonMobil Chemical Co., as well as the ENGAGE polymers available from Dow. Particular EXACT polymers include, but are not limited to EXACT 0201, EXACT 021HS, EXACT 0203, EXACT 8201, EXACT 8203, EXACT 210, and EXACT 8210. Typical ethylene alpha-olefins will have a density within the range having a lower limit of 0.86 g/cm$^3$, or 0.87 g/cm$^3$, or 0.88 g/cm$^3$ and an upper limit of 0.91 g/cm$^3$, or 0.92 g/cm$^3$, or 0.94 g/cm$^3$; and a melt index 12 of from a lower limit of 0.1, or 0.5, or 1.0 dg/min to an upper limit of 10, or 50, or 100 dg/min, consistent with the Melt Index Ratios described above.

In one or more embodiments, the power cable coating composition contains the one or more ethylene-alpha-olefins in an amount of from 40 wt % to 99 wt %, based on total weight of the composition. In one or more embodiments, the one or more ethylene-alpha-olefins are present in an amount ranging from a low of about 40 wt %, 50 wt %, or 60 wt % to a high of about 70 wt %, 80 wt %, or 90 wt %, based on total weight of the composition.

Rubber Curing Agent

Any curative that is capable of curing or crosslinking the elastomer can be used. Depending on the elastomer employed, certain curatives may be preferred. Illustrative curatives include, but are not limited to, phenolic resins, peroxides, maleimides, sulfur containing curatives, and silicon-containing curatives. Suitable phenolic resins are described in U.S. Pat. Nos. 2,972,600; 3,287,440; 4,311,628; and 6,433,090. A preferred phenolic resin curative is an octylphenol-formaldehyde resin sold commercially as SP-1045 from Schenectady International, Inc. Suitable peroxide curatives are disclosed in U.S. Pat. No. 5,656,693. Useful silicon-containing curatives include silicon hydride compounds having at least two SiH groups. Illustrative silicon hydride compounds include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Antioxidant

The power cable coating composition can include up to 10 wt % one or more antioxidants. Useful antioxidants can include one or more metal oxides and/or one or more non-metal oxides. Preferably, the antioxidant does not contain lead (Pb) or zinc (Zn). Suitable metal oxides can include one or more metal cations selected from the following categories in the Periodic Table of the Elements: Group 1, Group 2, Group 3, Group 12, Group 13, Group 14, Group 15, the first transition series, the second transition series, and the lanthanide series. Preferably, the metal cation of the oxide is non-paramagnetic. As used herein, the numbering scheme for the categories in the Periodic Table of the Elements refers to the new notation as set out in Chemical and Engineering News, 63(5), 27 (1985).

Particular Group 13 metal oxides include, but are not limited to, boron (III) oxide ($B_2O_3$), boric acid $B(OH)_3$, borate esters $B(OR)_3$ where R is alkyl or aryl. Particular Group 15 oxides include, but are not limited to, bismuth (III) oxide ($Bi_2O_3$) and antimony (V) oxide ($Sb_2O_5$). Particular metal oxides from the first transition series include, but are not limited to, manganese (II) oxide (MnO), manganese (III) oxide ($Mn_2O_3$), copper (I) oxide ($Cu_2O$), and copper (II) oxide (CuO). One particular metal oxide from the lanthanide series includes, but is not limited to, cerium (IV) oxide ($CeO_2$). One particular metal oxide from the second transition series includes, but is not limited to, molybdenum (IV) oxide ($MoO_2$). Another particular metal oxide can include derivatives such as sodium or other salts such as, but not limited to, sodium tetraborate ($Na_2B_4O_7$).

The above-mentioned oxides, similar to the lead oxides ($Pb_3O_4$, PbO, and $PbO_2$), are believed to exhibit the effect of interfering with either of two oxidation processes: autooxidation during hot-air oven aging of polymer, or electrochemical oxidation during field aging of cable, but are not environmentally restricted. In particular, these oxides may stabilize or react with either (a) the alkylperoxy radical intermediate, which is believed to form by reaction of oxygen with an alkyl (polymeric) carbon-centered radical, and which should be common to both processes, or (b) the alkyl hydroperoxide intermediate, which is believed to form by hydrogen abstraction, and which should be common to both processes. The ability of an oxide to inhibit polymeric oxidation in either of these oxidation processes can be a function of many factors, including, but not limited to, the acidic, basic, or amphoteric nature of the oxide, the valence state and the coordination number of the metal, cation radius, oxygen radius, and the resulting radius ratio, structural defects, cation vacancies, and oxygen vacancies in the oxide, the ionic/covalent nature of the bonding in the oxide, the isoelectric point of the oxide, and the thermodynamics affecting the formation of oxygenated species on the surface of the oxide.

In one or more embodiments, the power cable coating composition contains one or more oxides in an amount ranging from about 1 to about 10 parts by weight per 100 parts by weight of rubber (phr). In one or more embodiments, the oxide is present in an amount ranging from a low of about 1, 2, or 3 phr to a high of about 7, 8.5, or 9.9 phr. In one or more embodiments, the oxide is present in an amount greater than 1.0 phr and less than 10.0, 9.0, 8.0, 7.0, 6.0, 5.0, 4.0, 3.0, 2.0 or 1.5 phr.

Other Additives

The term "other additives" may include, but is not limited to, particulate fillers, lubricants, antioxidants, antiblocking agents, stabilizers, anti-degradants, anti-static agents, waxes, foaming agents, pigments, flame retardants, processing aids, adhesives, tackifiers, plasticizers, wax, and discontinuous fibers (such as wood cellulose fibers). Exemplary particulate fillers are carbon black, silica, titanium dioxide, calcium carbonate, colored pigments, clay, and combinations thereof. When non-black fillers are used, it may be desirable to include a coupling agent to compatibilize the interface between the non-black fillers and polymers. Desirable amounts of carbon black, or other particular fillers, when present, are from about 5 to about 250 phr.

Cable Coating

The compounds can be formed using conventional mixing and extrusion techniques. Preferably, the compounds are used as an insulator in a medium-voltage electrical or power cable. The term "medium voltage" refers to voltages less than 35 kV, and includes voltages of from 4 Kv to 35 kV; of from 5 Kv to 35 kV; of from 6 Kv to 35 kV; and of from 7 Kv to 35 kV. In a particular embodiment, the power cable coating composition is a medium voltage cable compound which meets the Insulated Cable Engineers Association (ICEA) specifications for medium voltage compounds. These specifications include:

Electrical properties: dielectric constant of less than 4.0, and dissipation factor of less than 0.015 (ASTM D150-98);

Physical properties: tensile strength greater than 8.2 MPa, and elongation to break greater than 250% (ASTM D412-92);

Heat aging properties: greater than 80% tensile retention and greater than 80% elongation retention after aging for 14 days at 121° C. (ExxonMobil Chemical Co. test procedure); and No gels: an absence of gelation regions in excess of 0.254 mm (ExxonMobil Chemical Co. test procedure).

EXAMPLES

The foregoing discussion can be further described with reference to the following non-limiting examples. Table 1 contains the formulations and physical properties for three specific power coating compounds that were evaluated. Though each of Examples 1, 2 and Comparative Example 1 contain zinc oxide, this oxide is not added for purposes of preventing electrochemical oxidation or ionic contamination, though some residual effects on these properties may result from its presence. Rather, the zinc oxide is present as an accelerant to speed the cross-linking reaction with the rubber component of the compound. Therefore, Comparative Example 1 will heretofore be referred to as "oxide free," meaning that it is free of any additional metal oxide added for purposes of testing their effects on electrochemical oxidation and/or ionic contamination.

TABLE 1

Formulations and Physical Properties for EPDM Insulation Compounds

|  | Example 1 | Example 2 | Comparative Ex. 1 |
|---|---|---|---|
| VISTALON 8731 | 100 | 100 | 100 |
| TRANSLINK 37 (clay) | 60 | 60 | 60 |
| AGERITE Resin D | 1.5 | 1.5 | 1.5 |
| DRIMIX A172 Silane | 1.0 | 1.0 | 1.0 |
| Zinc Oxide | 5.0 | 5.0 | 5.0 |
| Paraffin Wax 1236 | 5.0 | 5.0 | 5.0 |
| ESCORENE LD 400 | 5.0 | 5.0 | 5.0 |
| Lead Oxide ($Pb_3O_4$, 90%) | 5.0 | — | — |
| Bismuth Oxide ($Bi_2O_3$) | — | 5.0 | — |
| DiCup 40 KE | 6.5 | 6.5 | 6.5 |
| Total phr | 189 | 189 | 184 |

VISTALON 8731 is an EPDM rubber that is commercially available from ExxonMobil Chemical Company. VISTALON 8731 has a Mooney viscosity, ML (1+4) 125° C. of 24 (ASTM D-1646, modified), an ethylene content of 75.8 wt % (ASTM D-3900-B, modified), and an ethylidene norbornene (END) content of 3.3 wt % (ASTM D-6047).

TRANSLINK 37 (clay) is silane-treated calcined clay from Englehard.

AGERITE Resin D is polymerized 1,2-dihydro-2,2,4-trimethylquinoline from R.T. Vanderbilt.

DRIMIX A172 Silane is a solid formulation of vinyl trimethoxysilane from Kenrich Petrochemicals.

Paraffin Wax 1236 is low-molecular-weight paraffin wax from Hallstar.

ESCORENE LD 400 is low-density polyethylene from ExxonMobil Chemical Company.

The dicumyl peroxide (DiCup) was supplied by Geo Specialty Chemicals.

The compounds were mixed in a BR Banbury mixer (at 85 rpm) according to the following procedure outlined in Table 2 below.

TABLE 2

Blend Procedure

| Time (minutes) | Step |
|---|---|
| 0 | Add VISTALON 8731, AGERITE Resin D |
| 0.5 | Add ½ clay, DRIMIX A172 Silane, zinc oxide, Paraffin Wax 1236, ESCORENE LD 400, oxide (if present) |
| 2.0 | Add ¼ clay |
| 3.0 | Add ¼ clay |
| 4.0 | Sweep |
| 5.5 | Sweep |
| 7.0 | Dump (followed by addition of DiCup 40 KE on two-roll mill) |

Cured ASTM plaque samples (approximately 0.070 inches, 0.1778 cm in thickness) were then prepared in a hydraulic press and tested. Tests of the cured plaques were conducted according to the following test procedures listed in Table 3 where the test results are also shown.

TABLE 3

Physical Properties of Aged and Unaged Plaque Samples

| Properties | Test Procedure | Ex. 1 | Ex. 2 | Comp. Ex. 1 |
|---|---|---|---|---|
| Mooney Viscosity ML (1 + 4) 125° C., MU | ASTM D1646 | 32 | 27 | 27 |
| Mooney Scorch t3 at 132° C., minutes | ASTM D1646 | 24.2 | 19.7 | 29.1 |
| ODR: 200° C., 6 minutes | | | | |
| MI, dNm | ASTM D2084 | 7.9 | 7.2 | 7.2 |
| Mh, dNm | ASTM D2084 | 93.4 | 96.2 | 104.4 |
| Mh – MI, dNm/minute | ASTM D2084 | 85.5 | 89.0 | 97.2 |
| t'98, minutes | ASTM D2084 | 2.4 | 2.4 | 2.4 |
| Peak Rate, dNm/minute | ASTM D2084 | 91 | 94 | 107 |
| Press Cure: 165° C., 20 minutes | | | | |
| Hardness, Shore A | ASTM D2240 | 88 | 87 | 87 |
| 100% Modulus, MPa | ASTM D412 | 5.9 | 5.7 | 5.6 |
| 200% Modulus, MPa | ASTM D412 | 10.0 | 9.0 | 8.8 |
| Tensile Strength, MPa | ASTM D412 | 14.7 | 11.8 | 12.8 |
| Elongation at Break, % | ASTM D412 | 370 | 360 | 410 |
| Heat Aging: 150° C., 14 days | | | | |
| Tensile Strength, MPa | ASTM D412 | 14.0 | 13.7 | 12.9 |
| Percent of Original Retained | ASTM D412 | 95 | 116 | 100 |
| Elongation at Break, % | ASTM D412 | 280 | 240 | 300 |
| Percent of Original Retained | ASTM D412 | 75 | 66 | 73 |

Electrical Properties

Initial electrical properties for plaque samples of the insulation compounds were measured. Wet-electrical testing of cable samples was also performed. The experimental cable samples consist of 14 gauge solid copper wire, with an insulation layer around the conductor having a typical thickness of approximately 0.030 inches (0.0762 cm). Thus, the outside diameter for the cable samples was approximately 0.125 inches (0.3175 cm). No semi conductive conductor-shield or insulation-shield compounds were incorporated into the cables.

The cables were manufactured using the Davis Standard 1½" extruder (20:1 L/D), connected to a 66-foot steam continuous-vulcanization line. Pelletized rubber compound was used as feedstock, and typical conditions for the wireline operations were as follows: the line rate was approximately 32 feet per minute (975.36 cm/min), the extruder die head pressure was approximately 3500-3800 psig (24.13-26.20 MPa), and the steam vulcanization temperature was approximately 405° F. (207° C.).

The aging was performed with ten-foot (304.8 cm) sections of cable (three ten-foot specimens per sample) which were coiled and placed in large glass beaker containing tap water (see Attachment 6 for chemical analysis of the tap water).

This assembly was then kept in a water bath maintained at 90° C., and the samples received a continuous electrical stress of 600 volts (AC).

Two principal electrical tests were performed on the cables. These were (a) measurement of capacitance, for calculation of dissipation factor and dielectric constant, and (b) measurement of resistance. Electrical measurements were performed in accordance with UL 1581, section 1020, for capacitance, measured at 600 volts and 60 Hz; and UL 1581, section 920, and UL 44, section 39, for resistance, measured at 500 volts DC. Results for the wet-electrical aging of the cable samples are provided in Table 4. FIG. 2 graphically depicts the results for dissipation factor as a function of time.

TABLE 4

Electrical Properties for EPDM Insulation Compounds

|  | Example 1 | Example 2 | Comparative Example |
|---|---|---|---|
| Initial Properties[1] | | | |
| Dissipation Factor[2] | 0.0028 | 0.0031 | 0.0031 |
| Dielectric Constant | 2.55 | 2.59 | 2.51 |
| Volume Resistivity[3] ohm-cm × $10^{16}$ | 1.1 | 8.0 | 1.2 |
| Aged Properties[4] | | | |
| Dissipation Factor[2] | | | |
| Day 3 | 0.0067 | 0.0100 | 0.0149 |
| Day 10 | 0.0063 | 0.0071 | 0.0126 |
| Day 17 | 0.0064 | 0.0115 | 0.0141 |
| Day 24 | 0.0070 | 0.0086 | 0.0168 |
| Day 31 | 0.0075 | 0.0114 | 0.0189 |
| Day 38 | 0.0071 | 0.0183 | 0.0254 |
| Day 45 | 0.0084 | 0.0104 | 0.0285 |
| Day 52 | 0.0100 | 0.0168 | 0.0287 |
| Day 59 | 0.0090 | 0.0178 | 0.0298 |

[1]ASTM plaque sample; cured at 165° C. for 20 minutes; measurements at room temperature
[2]Measured with application of 600 volts AC at 60 Hz
[3]Measured with application of 500 volts DC
[4]Cable sample; aged in tap water at 90° C. with continuous stress of 600 volts; measurements at 90° C.

The cable based on Example 2 (bismuth oxide) exhibited much improved performance versus the cable based on the Comparative Example 1 (no oxide), and was comparable to the cable based on Example 1 (lead oxide). Surprisingly, the increase in dissipation factor as a function of time for wet-electrical aging occurred at a significantly slower rate for Example 2 compared to the Comparative Example 1 containing no oxide additive.

Examples 3-33

Additional tests were conducted using various other oxides than those shown in Examples 1 and 2. The tests of Table 5 were conducted on compounds mixed according to the following formula: 100 parts by weight VISTALON 8731, 2.5 phr metal oxide and 3.3 phr DiCup. These formulations were mixed and ASTM tensile pads were prepared by vulcanization of the compound at 180° C. for 10 minutes.

An Attenuated Total Reflectance Fourier Transform Infrared (ATR FTIR) procedure was employed that measures the extent of oxidation of the sample tensile pad by measuring: (a) the disappearance of aliphatic hydrogen through monitoring the absorption at 2848 $cm^{-1}$ and (b) the appearance of oxidation through monitoring the carbonyl absorption at 1711 $cm^{-1}$. The tensile pads were oven aged at 125° C. for 72 hours and the differences in both absorption values before and after aging for each pad was recorded.

The results of these tests are provided in Table 5. As shown in Table 5, the oxides tested were derived from elements in Groups 2, 3, 12, 13, 14, and 15, as well as the first and second transition series, and the lanthanide series.

TABLE 5

ATR FTIR Results for Aliphatic CH Absorption at 2.848 $cm^{-1}$ and Carbonyl Absorption at 1.711 $cm^{-1}$

| Example | Metal Oxide | Carbonyl Absorbance | Aliphatic Absorbance |
|---|---|---|---|
| 3 | $Cu_2O$ | 0.084 | 0.224 |
| 4 | MgO | 0.072 | 0.244 |
| 5 | TiO | 0.267 | 0.099 |
| 6 | MnO | 0.287 | 0.076 |
| 7 | CoO | 0.296 | 0.078 |
| 8 | CuO | 0.246 | 0.081 |
| 9 | ZnO | 0.050 | 0.287 |
| 10 | SnO | 0.254 | 0.098 |
| 11 | PbO | 0.055 | 0.211 |
| 12 | CaO | 0.173 | 0.142 |
| 13 | $B_2O_3$ | 0.024 | 0.272 |
| 14 | $Al_2O_3$ | 0.283 | 0.086 |
| 15 | $Fe_2O_3$ | 0.249 | 0.122 |
| 16 | $Ga_2O_3$ | 0.216 | 0.137 |
| 17 | $In_2O_3$ | 0.289 | 0.087 |
| 18 | $Sb_2O_3$ | 0.245 | 0.106 |
| 19 | $La_2O_3$ | 0.271 | 0.097 |
| 20 | $Bi_2O_3$ | 0.161 | 0.178 |
| 21 | $SiO_2$ | 0.248 | 0.084 |
| 22 | $TiO_2$ | 0.277 | 0.105 |
| 23 | $V_2O_4$ | 0.298 | 0.057 |
| 24 | $MnO_2$ | 0.297 | 0.080 |
| 25 | $GeO_2$ | 0.230 | 0.138 |
| 26 | $ZrO_2$ | 0.280 | 0.097 |
| 27 | $MoO_2$ | 0.196 | 0.156 |
| 28 | $SnO_2$ | 0.198 | 0.115 |
| 29 | $CeO_2$ | 0.215 | 0.111 |
| 30 | $PbO_2$ | 0.124 | 0.166 |
| 31 | $Nb_2O_5$ | 0.271 | 0.104 |
| 32 | $Sb_2O_5$ | 0.011 | 0.323 |
| 33 | $MoO_3$ | 0.269 | 0.101 |
| Comp.2 | None | 0.253 | 0.099 |

Temp = 125° C.
72 hour average

FIG. 1 graphically depicts the ATR FTIR absorbencies for aliphatic CH versus carbonyl. Several of the oxides, specifically $Sb_2O_5$, $B_2O_3$, ZnO, $Cu_2O$, $Bi_2O_3$, $MoO_2$, $Ga_2O_3$, $GeO_2$, $SnO_2$, $CeO_2$, MgO, and CaO, showed an inhibiting effect on the auto-oxidation reaction (as exhibited by a reduction in the carbonyl absorbance at 1711 $cm^{-1}$), which is clearly outside the standard deviation for the control sample (indicated by the vertical bars in FIG. 1 on either side of the average result for the control sample). Some of those oxides showed an inhibiting effect as good as PbO and $PbO_2$, and surprisingly some showed better inhibiting effects.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An insulation compound for a medium-voltage power cable, comprising:
   at least one elastomer comprising ethylene and one or more $C_3$-$C_8$ alpha olefins;
   zinc oxide; and
   of from 1 to 10 phr bismuth oxide ($Bi_2O_3$).

2. The compound of claim 1, wherein the compound comprises one or more curing agents.

3. The compound of claim 1, wherein the curing agent comprises one or more peroxides.

4. The compound of claim 1, wherein the curing agent is dicumyl peroxide.

5. The compound of claim 1, wherein the elastomer further comprises one or more non-conjugated dienes.

6. The compound of claim 5, wherein the non-conjugated diene is vinyl norbornene or ethylidene norbornene.

7. The compound of claim 1, wherein the elastomer is a terpolymer comprising ethylene, propylene, and vinyl norbornene.

8. The compound of claim 1, wherein the elastomer is a terpolymer comprising ethylene, propylene, and ethylidene norbornene.

9. A medium-voltage power cable, comprising:
   an insulative layer comprising:
      at least one rubber compound comprising ethylene, propylene and ethylidene norbornene, wherein the ethylene content is of from 50 wt % to 80 wt %, based on total weight of the rubber, and the ethylidene norbornene content is of from 1 wt % to 7 wt %, based on total weight of the rubber;
      zinc oxide; and
      of from 1 phr to 10 phr of one or more metal oxides, wherein the metal comprises bismuth oxide ($Bi_2O_3$).

* * * * *